Figure 1:
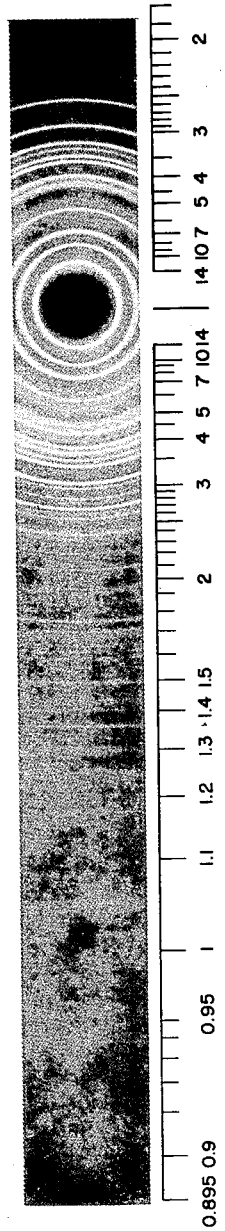

Nov. 21, 1961 E. E. SENSEL 3,009,776
PROCESS FOR PRODUCTION OF TYPE A ZEOLITE
Filed Sept. 26, 1957

X-RAY PATTERN OF HYDRATED 4 ANGSTROM SORBENT

INTERPLANAR SPACINGS ("d" SPACINGS) IN ANGSTROM UNITS

X-RAY PATTERN OF HYDRATED 4 ANGSTROM SORBENT

INTERPLANAR SPACINGS ("d" SPACINGS) IN ANGSTROM UNITS

United States Patent Office 3,009,776
Patented Nov. 21, 1961

3,009,776
PROCESS FOR PRODUCTION OF TYPE A ZEOLITE
Eugene E. Sensel, Beacon, N.Y., assignor to Texaco Inc., a corporation of Delaware
Filed Sept. 26, 1957, Ser. No. 686,531
8 Claims. (Cl. 23—112)

This invention relates to a process for producing the sodium form of the Type A zeolite.

Properties and structure of the Type A zeolite are described in the articles of Breck et al. and Reed et al. which appear on pages 5963–5977 of the Journal of the American Chemical Society, No. 23, vol. 78, December 8, 1956. The formula (less crystal water) represented for the sodium form of the Type A zeolite in the above-mentioned articles is $Na_{12}(AlO_2)_{12}\cdot(SiO_2)_{12}$ which is a multiple of 6 of the empirical mineralogical oxide formula $Na_2O\cdot Al_2O_3\cdot 2SiO_2$. For purposes of simplicity I prefer to use the oxide sort of formula for describing the Type A zeolite, but it will be understood that both kinds of formulae are interchangeable for purposes of reference herein to zeolites of Type A structure.

In dehydrated state the sodium form of the Type A zeolite has the property of selectively sorbing vapors of lower molecular weight materials such as water, ethane, ethylene, and propylene from mixtures of the same with larger molecules (e.g., non-straight chain hydrocarbons such as isoparaffinic, isoolefinic, naphthenic, and aromatic hydrocarbons). It is characterized broadly as having an effective pore size or pore diameter of approximately 4 Angstrom units and, for convenience, is often referred to as a 4 A. mineral sorbent. By ion exchanging a portion of the sodium component with certain divalent metal ions, e.g., calcium, zinc, cadmium, magnesium, or strontium, in the structure of the sodium Type A zeolite, the effective pore size or pore diameter can be made to increase to about 5 Angstrom units, the resulting zeolite for convenience often being referred to as a 5 A. mineral sorbent. It is useful in separating higher molecular weight normal paraffins, normal olefins, etc. from non-straight chain hydrocarbons, e.g., normal butane from isobutane, normal hexane from isoparaffinic hexanes, cyclohexane, and benzene, etc. In such process said 5 A. sorbent is contacted with the hydrocarbon mixture whereby it becomes laden with straight chain material; the laden sorbent can then be stripped, e.g., with a light gas such as nitrogen at elevated temperature and/or reduced pressure so that the sorbed straight chain materials are recovered.

Advantages of my process over prior methods of preparing the subject zeolite include significant economy both in the raw materials and in the equipment required to make the product sorbent.

My process comprises forming a reaction mixture of sodium hydroxide, an aluminum disilicate hydrate, and water in the ratio of about 1–2.2 mols of sodium hydroxide per gram atom of silicon in said disilicate, said reaction mixture having a free and combined water content of at least about 60% by weight, maintaining said reaction mixture in agitated condition for 3–100 hours at a temperature of 150–300° F., under pressure sufficient for maintaining the water present in liquid phase, the length of said time being correlated with the temperature used, and thereafter recovering said Type A zeolite from the resulting mixture.

The aluminum disilicate hydrates useful in the practice of my process include kaolinite, halloysite, metahalloysite, dickite, and nacrite, all of which appear to be of considerably more compact structure than the Type A zeolite. Preferably I use kaolinite for efficiency and economy in the practice of my invention although a good grade of halloysite can also be used with considerable economy and halloysite is readily obtainable. Minute amounts or traces of iron, magnesia, lime, soda, potash, titania, manganese, lead, phosphorus, sulfur, lithium, and/or organic material usually are found as contaminants in the commercial grades of these aluminum disilicate hydrates and, in the aggregate, the impurities frequently amount to between about 2 and about 18%. Often there is some variation in analyses of lots taken from the same deposit.

Usually the mol ratio of $SiO_2:Al_2O_3$ in these disilicates is very slightly in excess of 2:1, but in some cases it can be slightly below 2:1. In my process I proportion the amount of sodium hydroxide I use relative to the silicon in the disilicate, using at least a mol of NaOH per gram atom of silicon in the disilicate charged, and usually a small amount of caustic soda in excess of this. The excess caustic soda can be washed out of the resulting product with ease and does not contaminate the product as would a residue of unreacted aluminum disilicate. Accordingly, I use from about 1 to about 2.2 and preferably about 1.1 mols of sodium hydroxide per gram atom of silicon in the disilicate.

The proportion of water in the reaction mixture must be at least about 60% by weight, including combined water such as the water of hydration of the aluminum disilicate, so as to suppress formation of undesirable mineral phases (i.e., other than Type A zeolite); preferably the water content is about 65 to about 80% in the reaction mixture and it can be higher, e.g., 95% if desired.

The table below gives representative analysis of two typical kaolinites and a typical halloysite which are useful in the practice of my invention.

|  | Kaolinite, Lee Moor, England | Kaolinite, Macon, Ga. | Halloysite Eureka, Utah |
|---|---|---|---|
|  | Percent | Percent | Percent |
| $SiO_2$ | 47.21 | 45.20 | 43.98 |
| $Al_2O_3$ | 37.52 | 37.02 | 38.46 |
| $Fe_2O_3$ | .34 | 0.27 |  |
| FeO | .08 | 0.06 | 0.03 |
| MgO | .25 | 0.47 | Trace |
| CaO | .10 | 0.52 | 0.32 |
| $Na_2O$ | .02 | 0.36 | 0.14 |
| $K_2O$ | 1.30 | 0.49 | 0.48 |
| $H_2O$ (of hydration) | 12.45 | 13.27 | 14.59 |
| $H_2O$ (unbound) | 0.43 | 1.55 | 2.58 |
| $TiO_2$ | .03 | 1.26 | 0.01 |
| $P_2O_5$ | .09 |  |  |
| MnO | .01 |  |  |
|  | [1] 99.83 | [2] 100.47 | [3] 100.59 |

[1] 89.39% kaolinite, 10.61% impurities: sericite 5%, quartz 5%, feldspar 0.5%, tourmaline trace, limonite trace.
[2] 93.3% kaolinite and 6.7% impurities of which 1.5% is adsorbed water; $SiO_2:Al_2O_3$ ratio is 207:100, indicating free silica probably in the form of alpha quartz.
[3] 93.9% halloysite and 7.1% impurities of which 2.56% is adsorbed water.

In my process a reaction time of at least 3 hours is necessary to convert the reactants into the desired crystalline zeolite product, and time up to about 100 hours can be used. Mild agitation is preferred. The temperature range useful is 150–300° F. It is extremely important in my process to keep the water present in liquid phase, e.g., to operate below the boiling point of water when using atmospheric pressure or to use a pressure vessel for containing an autogenous pressure operation when temperatures from 212–300° F. are employed. The liquid water vehicle is necessary for the formation of the crystalline Type A zeolite.

The length of operating time is advantageously correlated with the temperature used to prevent objectionable amounts of undesirable mineral phases from being formed along with or to the exclusion of the crystalline Type A zeolite. Thus, at a low temperature of 175–225° F. the longer times of 20 to 100 hours can be best tolerated although shorter times of even less than 10 hours are adequate in some cases, particularly when the higher ratios, e.g., 1.5–2.2 mols of NaOH per gram atom of silicon are used. Using temperatures in the upper range of 275–300° F., the shorter times, i.e., 3 to 15 hours should be observed. In the intermediate temperature range of 230–270° F. correspondingly intermediate times are most advantageously used. Thus, one correlates the time with the ascending reaction temperature in approximately inverse proportion, that is, as the operating temperature is increased, the operating time should be decreased. Preferably I operate with reaction time between about 6 and about 40 hours and temperature in the range of about 175–225° F.

The caustic soda for my process can be a commercial grade, e.g., an aqueous caustic solution obtainable in tank cars, or it can be pellets or flakes. Advantageously, however, it is a by-product caustic soda solution such as that from the synthesis of additional hydrated sodium form of Type A zeolite by the reaction of sodium aluminate and sodium silicate as shown in my copending patent application entitled "Process for Production of Type A Zeolite," filed on even date herewith and having Serial No. 686,387.

In said synthesis (Equation 1, below) the reaction mixture of sodium aluminate, sodium silicate and water is formed in the proportions of 1.8–2.2 mols of equivalent silica and 1.3–2 mols of equivalent sodium oxide per mol of equivalent alumina in the reaction mixture. After 3 to 20 hours' operation at temperatures of 175–225° F. with agitation the sodium form of Type A zeolite results and there is left an aqueous mother liquor containing free caustic soda.

Accordingly, to the reaction mixture of sodium aluminate, sodium silicate, and water I can add sufficient aluminum disilicate hydrate such as kaolinite so that such sodium hydroxide by-product from the sodium aluminate-sodium silicate reaction is in the proportion of about 1:1.2 mols of NaOH per gram atom of silicon in the added silicate. The equations for the reaction can be written as follows:

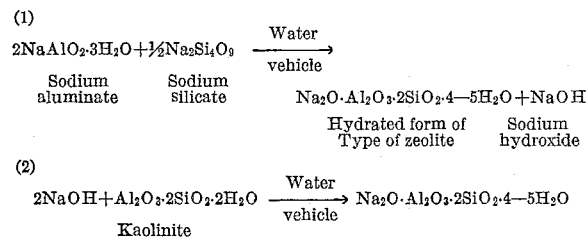

Alternatively, the caustic soda can be that in or recovered from the filtrate and/or wash liquors from zeolite product recovery and purification in aforementioned syntheses (Equation 1, above); it can be also spent soda solution from other manufacturing processes.

The aluminum disilicate hydrate is, of course, a solid and is advantageously comminuted to fine size for my process, e.g., 20 mesh (U.S. Standard Screen Scale) and finer, and is preferably about 200 mesh and finer. Such disilicate can be partially digested with caustic soda at room temperature prior to using it in the practice of my process, but this is not necessary. While I have found it possible, in the reaction of the aluminum disilicate hydrate such as kaolinite with plain aqueous NaOH, to add the necessary amount of caustic soda incrementally to the agitated reaction mixture over a period of about 1–3 hours, I prefer to add all this caustic soda initially to assist in suppressing formation of undesirable zeolite and/or ultramarine-type mineral phases deficient in selective sorbent properties in the product. I can replace part of the caustic soda with an equivalent amount of (basic hydrogen equivalents) sodium carbonate and/or sodium bicarbonate, using only so much caustic soda (NaOH) as is necessary to maintain pH of the aqueous reaction vehicle at least about 11, and, preferably, about 12 or higher.

At the end of the reaction period the resulting fully hydrated crystalline sodium alumino silicate (Type A zeolite), $Na_2O \cdot Al_2O_3 \cdot 2SiO_2 \cdot 4$–$5H_2O$, is present as a solid fraction. It is separated from the aqueous mother liquor most simply by filtration. Other solid separation techniques such as settling, centrifuging, or the like can also be used to separate the crystalline solid fraction. The separated solid is preferably washed with water to remove occluded impurities and mother liquor. The product can be air dried conveniently to remove extraneous dampness (other than the 4–5 molecules of water of hydration).

The separated hydrated sodium form of the Type A zeolite is conveniently virtually completely dehydrated simply by calcining in air at a temperature between 220° and 1000° F. Use of temperatures substantially above about 1000° F. in this operation can cause collapse of the crystal structure and loss of sorbent qualities. Preferably for efficiency and economy in dehydration, a temperature of 300–600° F. is used. If desired, subatmospheric pressure can also be used, but atmospheric pressure dehydration is preferred. It is advantageous during such dehydration to sweep water vapors from the heater with a current of air or other gas. The resulting dehydrated mineral sorbent, having the formula $Na_2O \cdot Al_2O_3 \cdot 2SiO_2$ and containing no appreciable water, is a fine crystalline powder.

For sorption of vapors the fine particles whether in hydrated or dehydrated state, are best agglomerated, e.g., by pelleting or extruding through a die with a suitable binder. The fine particles can be agglomerated and stabilized for greater strength, for example, by processes described in the following copending U.S. patent applications: Riordan et al., Serial No. 544,244, filed on November 1, 1955, now U.S. Patent 2,970,968, assigned to the Texas Company; Hess et al., Serial No. 544,185, filed on November 1, 1955, now U.S. Patent 2,885,368, also assigned to the Texas Company; and Ray, Serial No. 599,231, filed on July 20, 1956, now U.S. Patent 2,947,709, also assigned to the Texas Company. It will be understood, however, that moisture and/or combustible lubricating pill binder can be removed from the agglomerated sorbent by calcining.

Figure 2:
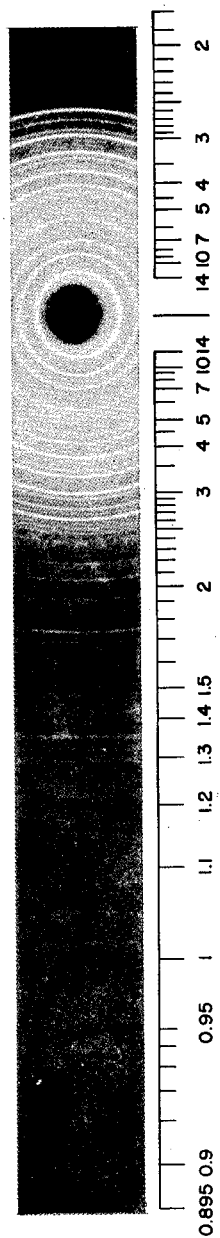

The drawings are reproductions of typical X-ray diffraction patterns of fully hydrated Type A zeolites (sodium form) made by my process. FIGURE 1 shows the X-ray diffraction pattern of the product made from kaolinite and a mixture of sodium aluminate and sodium silicate. FIGURE 2 shows the X-ray diffraction pattern for the same kind of product using essentially the same process except that halloysite was used instead of kaolinite. Halloysite is a more amorphous and less crystalline material than is kaolinite. These X-ray diffraction patterns do not agree with those of more than 1000 natural minerals and synthetic chemicals available for comparison.

The sodium form of Type A zeolite can be converted into a calcium-sodium alumino-silicate, $$(Ca, Na_2)O \cdot Al_2O_3 \cdot 2SiO_2 \cdot 4\text{–}5H_2O$$

having as effective pore size or diameter of about 5 Angstrom units by base exchanging sodium in the structure for calcium, and thereafter dehydrating as described hereinbefore. In such operation at least 25% and preferably 40–80% of the sodium in the original 4 A. material should be replaced by calcium. A simple way to conduct the base exchange is to wash the uncalcined, hydrated sodium alumino-silicate substantially free of any retained alkali with water, then agitate it for ½ hour to two days in, for example, 0.1 to 5 N aqueous calcium chloride solution, discarding the calcium chloride solution and repeating this treatmtnt with fresh calcium chloride solution until the necessary proportion of the sodium originally present in the structure has been replaced by calcium. Operating at room temperature and pressure five changes of 0.1 N calcium chloride solution are usually adequate to obtain sufficient calcium substitution for making the 5 A. sorbent. Prior to or after calcining the resultant 5 A. mineral sorbent can be agglomerated and/or stabilized as hereinbefore set forth.

The following examples show various ways in which my invention has been practiced but should not be construed as limiting the invention. The X-ray diffraction patterns of the hydrated sodium alumino-silicates (Type A zeolites) produced from kaolinite in the following preparations did not differ significantly from the pattern shown in FIGURE 1; the X-ray diffraction patterns of the Type A zeolites produced from halloysite in the following preparations did not differ significantly from the pattern shown in FIGURE 2. All percentages, unless otherwise expressed, are weight percentages, all parts are weight parts, and all temperatures are in degrees Fahrenhent. All disilicate was pulverulent.

*Example 1.*—259 parts of commercial grade sodium aluminate were dissolved in 920 parts of water and charged into an agitated steel reactor. To the sodium aluminate solution was added 500 parts of commercial sodium silicate solution and 245 parts of kaolinite from Cornwall, England.

The kaolinite assayed 38.18% $Al_2O_3$, 45.80% $SiO_2$, and 12.94% $H_2O$. The sodium aluminate used was the product of the Harshaw Chemical Company and it analyzed 28.26% $Na_2O$, 2.84% NaOH, 46.49% $Al_2O_3$, and 22.41% $H_2O$. The sodium silicate solution was the "N" brand grade of the Philadelphia Quartz Company. The characteristic analysis of this grade of sodium silicate is: 8.9% $Na_2O$, 28.7% $SiO_2$, 62.4% $H_2O$, with an $Na_2O/SiO_2$ mol ratio of 1.0/3.33 and a specific gravity of 1.393 at 60° F.

The reaction mixture was maintained in agitated state for 60 hours at 175° F. Yield of fully hydrated Type A zeolite (sodium form) was virtually complete.

*Example 2.*—Product samples withdrawn at 20, 40, and 60 hours from the operation described in Example 1 were filtered. The solid fraction recovered was washed with water. The so-recovered sorbents were converted into 5 A. mineral sorbent by ion exchange with aqueous calcium chloride, replacing an estimated one-half of the sodium in the parent material with calcium. Upon dehydration the resulting calcium-sodium alumino-silicate sorbent had the following sorption capacity in terms of cc. of hydrocarbon vapor per gram of sorbent at 75° F. and 760 mm. Hg. total pressure.

|  | 20 Hours | 40 Hours | 60 Hours |
| --- | --- | --- | --- |
| n-butane | 33 | 33 | 36 |
| isobutane | 3.1 | 2.3 | 2.3 |

*Example 3.*—The same kind of reaction mixture as in Example 1 was maintained at 225° F. for 40 hours with agitation. Samples of product taken at 12 and 40 hours, respectively, were ion-exchanged with aqueous calcium chloride to form the corresponding 5 A. mineral sorbents, an estimated one-half of the sodium in the parent sorbent being replaced by calcium. The sorption capacity in terms of cc. of normal butane and isobutane per gram of sorbent at 75° F. and 760 mm. Hg. total pressure was 35 n-butane and 2.6 isobutane for the 12-hour material and 34 n-butane and 1.8 isobutane for the 40 hour material.

Showing the deleterious effect of prolonged reaction times when using an operating temperature approaching 300° F. is the following table wherein the same kind of reaction mixture as in Example 1 was maintained at 275° F. for 60 hours with agitation, samples being taken at 20 hours, 42 hours, and 60 hours, said samples being filtered, and the resulting solid washed and converted into 5 A. mineral sorbent by ion-exchanging an estimated one-half of the sodium in the parent sorbent for calcium using aqueous calcium chloride solution. The table shows sorption capacity in terms of cc. of gaseous hydrocarbon per gram of sorbent at 75° F. and 760 mm. Hg. total pressure.

|  | 20 Hours | 42 Hours | 60 Hours |
| --- | --- | --- | --- |
| n-butane | 25 | 28 | 25 |
| isobutane | 3.1 | 2.4 | 2.2 |

*Example 4.*—259 parts of the same kind of commercial sodium aluminate as used in Example 1 was dissolved in 918 parts of water and there was added to the solution 500 parts of "N" brand sodium silicate, the same kind as was used in Example 1, and 247 parts of a commercial grade of kaolinite from Dry Branch, Georgia, said kaolinite having 13.89% water and an analysis generally similar to the kaolinite from Macon, Georgia, described hereinbefore.

This reaction mixture was agitated for 10 hours at 175° F. The fully hydrated Type A zeolite so formed was separated from the resulting mixture by filtration, and washed with water to remove occluded impurities and mother liquor. When this product was converted into a 5 A. mineral sorbent in a manner similar to that shown in Example 3, above, the capacities of the resulting sorbent (in dehydrated state) for n-butane and isobutane at 75° F. and 760 mm. Hg were 39 cc. per gram and 2.9 cc. per gram, respectively.

*Example 5.*—259 parts of the same kind of sodium aluminate as used in Example 1 was dissolved in 896 parts of water, then 500 parts of "N" brand sodium silicate, the same kind as was used in Example 1, and 269 parts of Eureka (Utah) halloysite were added. The halloysite had 20.93% water; its analysis was generally similar to the Eureka halloysite shown hereinbefore.

The fully hydrated sodium form of Type A zeolite was made by agitating the foregoing mixture for 10 hours at 175° F., then filtering off the resulting solid fraction, namely, said hydrated 4 A. sorbent, and washing it with water to remove occluded impurities and mother liquor. When this product was converted into a 5 A. mineral sorbent in a manner similar to that shown in Example 3, above, the capacities of the resulting sorbent (in dehydrated state) for n-butane and isobutane at 75° F. and 760 mm. Hg were 48 cc. per gram and 4.6 cc. per gram, respectively.

*Example 6.*—400 parts of the same kind of Eureka halloysite as used in Example 5, 113.8 parts of dry sodium hydroxide pellets, and 811 parts of water were formed into a reaction mixture and maintained with agitation for 20 hours at 175° F. At the end of this time the resulting solid fraction, the fully hydrated sodium form of Type A zeolite, was separated from the mother liquor by filtration and washed with water to remove occluded impurities.

*Example 7.*—Three reaction mixtures were made up, each containing 200 parts of the same kind of Eureka halloysite as used in Example 5, i.e., 200 mesh and finer particle size, 113.8 parts of sodium hydroxide pellets, and 818 parts of water, there being approximately two gram mols of sodium hydroxide present per gram atom of silicon from the disilicate. All these reaction mixtures were maintained with agitation at 200° F., the first for 20 hours, the second for 40 hours, and the third for 80 hours. At the end of such reaction period, hydrated sodium form of Type A zeolite was recovered from each reaction mixture by filtration from the mother liquor. The products were washed with water to remove occluded impurities.

Showing the importance of control of caustic soda proportion relative to disilicate, a run was made with 200 parts of the same kind of Eureka halloysite as used in Example 7, 171 parts of sodium hydroxide pellets, and 818 parts of water. This reaction mixture contained about 3 gram mols of NaOH per gram atom of silicon from the disilicate. It was maintained at 200° F. for 11 hours. At the end of this time the solid product was recovered from the mother liquor. Only a trace of the sodium form of Type A zeolite was present in the product; the product appeared to be, in the main, zeolite C which lacks the selective sorbing properties of Type A structure.

I claim:

1. A process for producing the sodium form of Type A crystalline zeolite which comprises forming a reaction mixture of sodium hydroxide, a crystalline aluminum disilicate hydrate, and water using a ratio of about 1–2.2 gram mols of sodium hydroxide per gram atom of silicon in said disilicate, said reaction mixture having a free and combined water content of at least about 60% by weight, maintaining said reaction mixture in agitated condition for 3–100 hours at a temperature of 175–300° F. under pressure sufficient for maintaining the water present in liquid phase, the length of said time being 3 to 15 hours when operating in the portion of said range from 275° to 300° F., and thereafter recovering said Type A zeolite from the resulting mixture.

2. The process of claim 1 wherein said aluminum disilicate hydrate is kaolinite.

3. The process of claim 1 wherein said aluminum disilicate is halloysite.

4. The process of claim 1 wherein the water content of said reaction mixture is 65–80%, the reaction time is 6–40 hours, and temperature is 175–225° F.

5. The process of claim 1 wherein said sodium hydroxide is that resulting from the synthesis of additional Type A zeolite by the reaction of sodium aluminate and sodium silicate at a temperature of 175°–225° F. with agitation for 3–20 hours.

6. The process of claim 5 wherein the amount of said sodium aluminate and sodium silicate used in the synthesis of said additional Type A zeolite is sufficient to establish the proportions of 1.8–2.2 mols of equivalent silica and 1.3–2 mols of equivalent sodium oxide per mol of equivalent alumina therebetween, and said aluminum disilicate hydrate is added to the reaction mixture of said sodium silicate and sodium aluminate whereby the sodium hydroxide by-product from said reaction is present in the proportion of from 1 to 2.2 gram mols of sodium hydroxide per gram atom of silicon in said added disilicate hydrate.

7. The process of claim 1 wherein the aluminum disilicate hydrate is selected from the group consisting of kaolinite, halloysite, metahalloysite, dickite and nacrite.

8. In a process for the production of the sodium form of Type A crystalline zeolite substantially free from contaminating mineral phases wherein a reaction mixture containing a sodium oxide providing material, an aluminum oxide providing material, a silicon oxide providing material and water is heated to and maintained at an elevated temperature with agitation for a period of time sufficient to form said zeolite and recovering the formed zeolite, the improvement which comprises forming the reaction mixture from sodium hydroxide, a crystalline aluminum disilicate hydrate and water, said sodium hydroxide reactant being present in the mixture in an amount within the range of from 1 to 2.2 gram mols per gram atom of silicon in said disilicate; and wherein the free and combined water content of the reaction mixture is at least about 60 percent by weight thereof; maintaining said reaction mixture with agitation for a period of time within the range of from 3 to 100 hours at a temperature within the range of from 175° to 300° F. at a pressure sufficient to maintain the water present in liquid phase, said time interval being within the range of from 3 to 15 hours when operating in the temperature range of from 275 to 300° F., and recovering said formed Type A zeolite from the reacted mixture.

References Cited in the file of this patent

UNITED STATES PATENTS

| 2,544,695 | Kumins | Mar. 13, 1951 |
| 2,882,243 | Milton | Apr. 14, 1959 |

FOREIGN PATENTS

| 777,232 | Great Britain | June 19, 1957 |

OTHER REFERENCES

Mellor: "Comprehensive Treatise on Inorganic and Theoretical Chemistry," vol. 6, Part II, pages 571, 568 and 574.

Taylor: "Industrial Hydrogen," A.C.S. Monograph Series No. 4, chap. VI, page 123.

Kumins et al.: "Ind. and Eng. Chem.," 45, 562–72 (1953).

UNITED STATES PATENT OFFICE
CERTIFICATION OF CORRECTION

Patent No. 3,009,776                            November 21, 1961

Eugene E. Sensel

It is hereby certified that error appears in the above numbered patent requiring correction and that the said Letters Patent should read as corrected below.

Column 3, line 46, after "Type" strike out "of" and insert -- A --.

Signed and sealed this 10th day of April 1962.

(SEAL)
Attest:

ERNEST W. SWIDER
Attesting Officer

DAVID L. LADD
Commissioner of Patents